United States Patent
Kim et al.

(10) Patent No.: US 11,370,851 B2
(45) Date of Patent: Jun. 28, 2022

(54) TRANSITION METAL COMPOUND AND METHOD FOR PREPARING POLYPROPYLENE USING THE SAME

(71) Applicant: LG Chem, Ltd., Seoul (KR)

(72) Inventors: Byung Seok Kim, Daejeon (KR); Insun Lee, Daejeon (KR); Seok Hwan Kim, Daejeon (KR); Hye Kyung Lee, Daejeon (KR); Sangjin Jeon, Daejeon (KR); Seyoung Kim, Daejeon (KR)

(73) Assignee: LG Chem, Ltd.

( * ) Notice: Subject to any disclaimer, the term of this patent is extended or adjusted under 35 U.S.C. 154(b) by 28 days.

(21) Appl. No.: 17/251,026

(22) PCT Filed: Jun. 13, 2019

(86) PCT No.: PCT/KR2019/007152
§ 371 (c)(1),
(2) Date: Dec. 10, 2020

(87) PCT Pub. No.: WO2020/091177
PCT Pub. Date: May 7, 2020

(65) Prior Publication Data
US 2021/0189025 A1    Jun. 24, 2021

(30) Foreign Application Priority Data

Nov. 2, 2018  (KR) .................. 10-2018-0133858
Jun. 12, 2019  (KR) .................. 10-2019-0069233

(51) Int. Cl.
| C08F 4/6592 | (2006.01) |
| C08F 110/06 | (2006.01) |
| C07F 17/00 | (2006.01) |
| C08F 4/52 | (2006.01) |
| C08F 4/642 | (2006.01) |

(52) U.S. Cl.
CPC .......... *C08F 4/65927* (2013.01); *C07F 17/00* (2013.01); *C08F 4/52* (2013.01); *C08F 4/642* (2013.01); *C08F 110/06* (2013.01)

(58) Field of Classification Search
CPC ..................... C08F 4/65927; C08F 110/06
See application file for complete search history.

(56) References Cited

U.S. PATENT DOCUMENTS

| 2003/0130443 A1 | 7/2003 | Suhm et al. |
| 2006/0116490 A1 | 6/2006 | Paczkowski et al. |
| 2006/0264587 A1 | 11/2006 | Sell et al. |
| 2014/0121341 A1 | 5/2014 | Holtcamp et al. |
| 2015/0025207 A1 | 1/2015 | Canich et al. |
| 2017/0037164 A1 | 2/2017 | Ajellal et al. |
| 2018/0201638 A1 | 7/2018 | Piao et al. |
| 2018/0258195 A1 | 9/2018 | Luo et al. |
| 2019/0085100 A1 | 3/2019 | Song et al. |
| 2020/0190238 A1 | 6/2020 | Lee et al. |

FOREIGN PATENT DOCUMENTS

| EP | 2933277 A1 | 10/2015 |
| JP | 5052068 B2 | 10/2012 |
| JP | 2016160294 A | 9/2016 |
| KR | 20070092217 A | 9/2007 |
| KR | 20170008987 A | 1/2017 |
| KR | 20170082917 A | 7/2017 |
| KR | 20170099691 A | 9/2017 |
| KR | 101835285 B1 | 3/2018 |
| KR | 20180035387 A | 4/2018 |
| KR | 20180040405 A | 4/2018 |
| KR | 20180067945 A | 6/2018 |
| WO | 2001046274 A1 | 6/2001 |
| WO | 2006124231 A1 | 11/2006 |
| WO | 2014070655 A1 | 5/2014 |
| WO | 2015009473 A1 | 1/2015 |
| WO | 2016195865 A1 | 12/2016 |
| WO | 2016196339 A2 | 12/2016 |

OTHER PUBLICATIONS

Extended European Search Report including Written Opinion for Application No. 19879818.3 dated Jul. 28, 2021, pp. 1-9.
International Search Report for Application No. PCT/KR2019/007152 dated Oct. 1, 2019, 2 pages.

*Primary Examiner* — Caixia Lu
(74) *Attorney, Agent, or Firm* — Lerner, David, Littenberg, Krumholz & Mentlik, LLP

(57) ABSTRACT

The present disclosure provides a novel transition metal compound which exhibits excellent catalytic activity and is useful in the preparation of a polypropylene having high impact strength, and a method for preparing a homo polypropylene using the same.

17 Claims, No Drawings

TRANSITION METAL COMPOUND AND METHOD FOR PREPARING POLYPROPYLENE USING THE SAME

CROSS-REFERENCE TO RELATED APPLICATION(S)

This application is a national phase entry under 35 U.S.C. § 371 of International Application No. PCT/KR2019/007152 filed Jun. 13, 2019, which claims priority from Korean Patent Application No. 10-2018-0133858 filed Nov. 2, 2018, and Korean Patent Application No. 10-2019-0069233 filed Jun. 12, 2019, all of which are incorporated herein by reference.

TECHNICAL FIELD

The present disclosure relates to a novel transition metal compound and a method for preparing a polypropylene using the same.

BACKGROUND ART

Olefin polymerization catalyst systems may be divided into Ziegler-Natty and metallocene catalysts, and these highly active catalyst systems have been developed in accordance with their characteristics. Since the Ziegler-Natty catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties. Meanwhile, the metallocene catalyst includes a main catalyst having a transition metal compound as a main component and an organometallic compound cocatalyst having aluminum as a main component. The metallocene catalyst is a single-site catalyst which is a homogeneous complex catalyst. Accordingly, a polymer prepared using the metallocene catalyst has a narrow molecular weight distribution and a uniform compositional distribution of comonomers. The stereoregularity, copolymerization characteristics, molecular weight, crystallinity, etc. of the resulting polymer may be controlled by changing a ligand structure of the catalyst and polymerization conditions. Recently, due to changes in environmental awareness, it has been attempted to reduce the generation of volatile organic compounds (VOCs) in many products. However, the Ziegler-Natta catalyst (Z/N), which is mainly used in the preparation of the conventional impact polypropylene (Impact PP), has a problem of generating many VOCs. In order to solve this problem, a method for preparing impact PP using a metallocene catalyst has been proposed. Although this method can reduce the amount of total volatile organic compounds (TVOC) as compared with Z/N, the resulting polymer has low impact strength, so that it is difficult to practically apply it.

DETAILED DESCRIPTION OF THE INVENTION

Technical Problem

Accordingly, the present disclosure is to provide a novel transition metal compound which exhibits excellent catalytic activity and is useful in the preparation of a polypropylene having high impact strength, and a method for preparing a horny polypropylene using the same.

Technical Solution

According to an embodiment of the present disclosure, a transition metal compound represented by the following Chemical Formula 1 is provided:

[Chemical Formula 1]

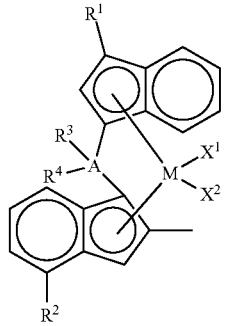

wherein, in Chemical Formula 1,
A is carbon or silicon;
M is a Group 4 transition metal;
$R^1$ is a $C_{1-20}$ alkyl, or a $C_{6-20}$ aryl unsubstituted or substituted with a $C_{1-20}$ alkyl;
$R^2$ is a $C_{6-20}$ aryl substituted with a $C_{1-20}$ alkyl;
$R^3$ and $R^4$ are each independently a $C_{1-20}$ alkyl; and
$X^1$ and $X^2$ are each independently a halogen.

According to another embodiment of the present disclosure, a catalyst composition including the transition metal compound is provided.

According to another embodiment of the present disclosure, a method for preparing a homo polypropylene is provided, including a step of polymerizing propylene monomers by introducing hydrogen in the presence of the catalyst composition.

Advantageous Effects

Since the transition metal compound according to the present disclosure has a pseudo C2-symmetric structure, it may exhibit excellent catalytic activity when used as a polymerization catalyst for preparing a polypropylene and may improve impact strength of the polypropylene to be prepared. In addition, the transition metal compound may reduce TVOC generated during the preparation of a polypropylene.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include" "have", or "possess" specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

Hereinafter, the transition metal compound, the catalyst composition including the same, and the method for preparing a homo polypropylene using the same according to the present disclosure will be described in detail.

Specifically, the transition metal compound according to an embodiment of the present disclosure is represented by the following Chemical Formula 1:

[Chemical Formula 1]

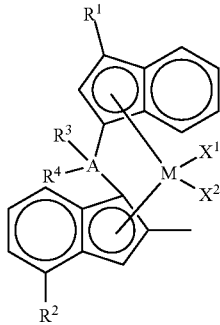

wherein, in Chemical Formula 1,
A is carbon (C) or silicon (Si);
M is a Group 4 transition metal;
$R^1$ is a $C_{1-20}$ alkyl, or a $C_{6-20}$ aryl unsubstituted or substituted with a $C_{1-20}$ alkyl;
$R^2$ is a $C_{6-20}$ aryl substituted with a $C_{1-20}$ alkyl;
$R^3$ and $R^4$ are each independently a $C_{1-20}$ alkyl; and
$X^1$ and $X^2$ are each independently a halogen.

Unless otherwise specified herein, the following terms may be defined as follows.

The halogen may be fluorine (F), chlorine (Cl), bromine (Br), or iodine (I).

The $C_{1-20}$ alkyl group may be a linear, branched, or cyclic alkyl group. Specifically, the $C_{1-20}$ alkyl group may be a $C_{1-15}$ linear alkyl group, a $C_{1-10}$ linear alkyl group, a $C_{1-5}$ linear alkyl group, a $C_{3-20}$ branched or cyclic alkyl group, a $C_{3-15}$ branched or cyclic alkyl group, or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, or the like.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may be a monocyclic, bicyclic, or tricyclic aromatic hydrocarbon. Specifically, the $C_{6-30}$ aryl may be phenyl, naphthyl, anthracenyl, or the like.

The $C_{7-30}$ alkylaryl may include a substituent in which at least one hydrogen of the aryl is substituted with alkyl. Specifically, the $C_{7-30}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-30}$ arylalkyl may include a substituent in which at least one hydrogen of the alkyl is substituted with aryl. Specifically, the $C_{7-30}$ arylalkyl may be benzyl, phenylpropyl, or phenylhexyl.

The transition metal compound of Chemical Formula 1 has a C2-symmetric structure for maintaining isotacticity in the polymerization of a polypropylene, and a pseudo C2-symmetric structure capable of realizing all characteristics of the two indene-structural ligands. Accordingly, the transition metal compound may exhibit excellent catalytic activity, because it may have various characteristics or may selectively take advantage of the two indene-structural ligands.

In addition, the transition metal compound represented by the above Chemical Formula 1 includes a divalent functional group A which is disubstituted with an alkyl group having at least 1 carbon atom ($R^3$ and $R^4$) as a bridge group connecting two indene-structural ligands. As a result, the transition metal compound has an increased size of atom and an increased usable angle, so that monomers may easily approach thereto during the preparation of the polymer, resulting in better catalytic activity.

In addition, the transition metal compound of Chemical Formula 1 has an asymmetric structure in which two ligand structures are different from each other; one of the two indene-structural ligands is substituted with $R^1$ at position 3, and the other ligand is substituted with methyl and $R^2$ at positions 2 and 4, respectively. Accordingly, it is possible to lower a melting point by controlling tacticity in the molecular structure in the preparation of a polypropylene polymer.

Further, the ligand in which only the position 3 is substituted may prepare a polymer having a narrower molecular weight distribution as compared with a ligand in which other positions are substituted. The substituent $R^1$ at position 3 may be, specifically, a $C_{1-20}$ or $C_{3-10}$ alkyl, or a $C_{6-20}$ or $C_{6-12}$ aryl unsubstituted or substituted with a $C_{1-20}$ alkyl. More specifically, the substituent $R^1$ may be a $C_{3-10}$ or $C_{4-10}$ linear alkyl such as n-butyl, n-heptyl, and the like; a $C_{3-10}$ branched alkyl such as isopropyl, t-butyl, and the like; phenyl; or phenyl substituted with a $C_{3-6}$ branched alkyl such as t-butylphenyl, and the like, which may exhibit higher catalytic activity.

In the case of the ligand in which the positions 2 and 4 are substituted, the position 2 may be substituted with methyl and the position 4 may be substituted with a functional group $R^2$, specifically a $C_{6-20}$ aryl substituted with a $C_{1-20}$ alkyl. As described above, since the carbon at a specific position of the ligand is substituted with one of the above-mentioned functional groups, it is possible to exhibit better catalytic activity due to an inductive effect capable of providing sufficient electrons.

More specifically, in the above Chemical Formula 1, $R^2$ may be a phenyl group substituted with a $C_{3-6}$ branched alkyl group such as tert-butylphenyl, and the substitution position of the $C_{3-6}$ branched alkyl group with respect to the phenyl group may be a position 4 corresponding to a para-position with respect to $R^2$.

In addition, the transition metal compound of Chemical Formula 1 may include a Group 4 transition metal such as zirconium (Zr), hafnium (Hf), and the like as a central metal (M). In particular, when the transition metal compound contains zirconium (Zr) as a central metal, it may have more orbitals capable of accepting electrons as compared with the transition metal compound containing another group 4 transition metal such as Hf. Accordingly, it can bind to monomers with higher affinity, resulting in much improved catalytic activity.

In Chemical Formula 1, $X^1$ and $X^2$ may each independently be chloro.

In Chemical Formula 1, A may be silicon (Si). In addition, the substituents $R^3$ and $R^4$ with respect to A may be identical for improving supporting efficiency by increasing solubility, and each may be a $C_{1-10}$ alkyl, more specifically a $C_{1-4}$ linear alkyl, and much more specifically a methyl group. By using the identical alkyl groups as the substituents with respect to the bridge group A, solubility may become excellent in the preparation of the supported catalyst and thus supporting reactivity may be improved.

Representative examples of the transition metal compound of the above Chemical Formula 1 may include compounds having the following structures:

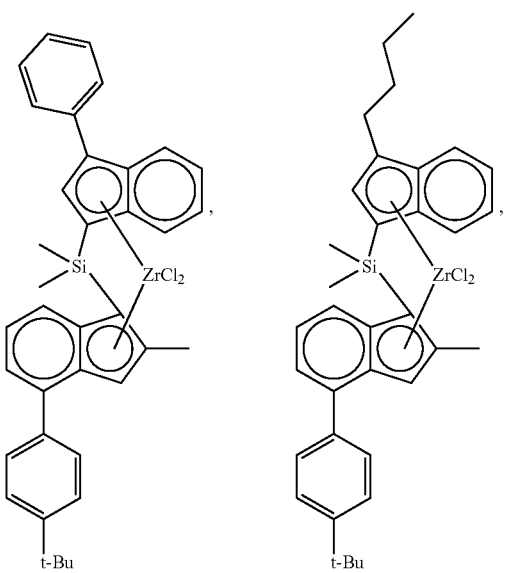

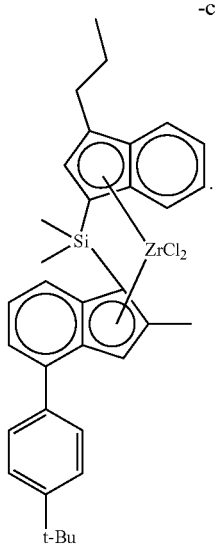

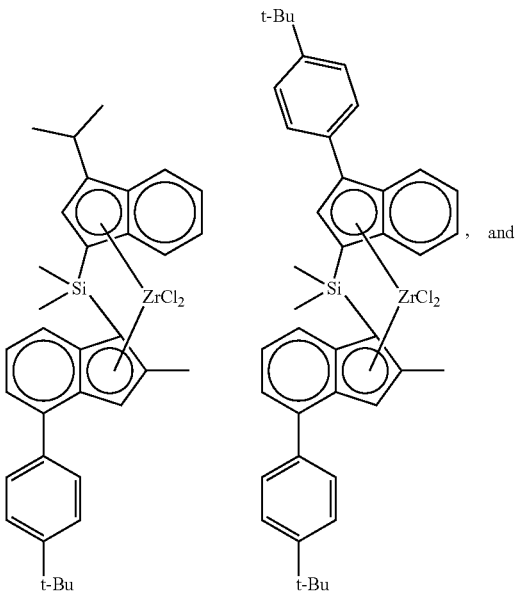

The transition metal compound of Chemical Formula 1 may be prepared by reacting a ligand compound of Chemical Formula 2 with a halide containing a Group 4 transition metal:

[Chemical Formula 2]

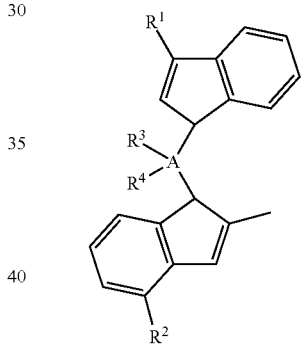

wherein, in Chemical Formula 2, $R^1$ to $R^4$ and A are as defined above.

The following Reaction Formula 1 shows a ligand compound used in the preparation of the transition metal compound according to an embodiment of the present disclosure and a method for preparing the transition metal compound using the same. The following Reaction Formula 1 is an example for illustrating the present disclosure, and the present disclosure is not limited thereto.

Referring to the following Reaction Formula 1, the transition metal compound of Chemical Formula 1 according to an embodiment of the present disclosure may be prepared by a method including the steps of: reacting a first indene compound (I) in which position 3 is substituted with a functional group of $R^1$ with a bridge group-providing compound (II) such as dimethyldichlorosilane in the presence of alkyllithium such as butyllithium (n-BuLi) to prepare a bridge group-containing indene compound (III); reacting the bridge group-containing indene compound (III) with a second indene compound (IV) in which positions 2 and 4 are substituted with methyl and $R^2$, respectively, in the presence of an alkyllithium such as butyllithium (n-BuLi) and CuCN to prepare a ligand compound (2); and reacting the ligand compound (2) with a halide containing a Group 4 transition metal such as ZrCl$_4$ to prepare a transition metal compound (1) of Chemical Formula 1.

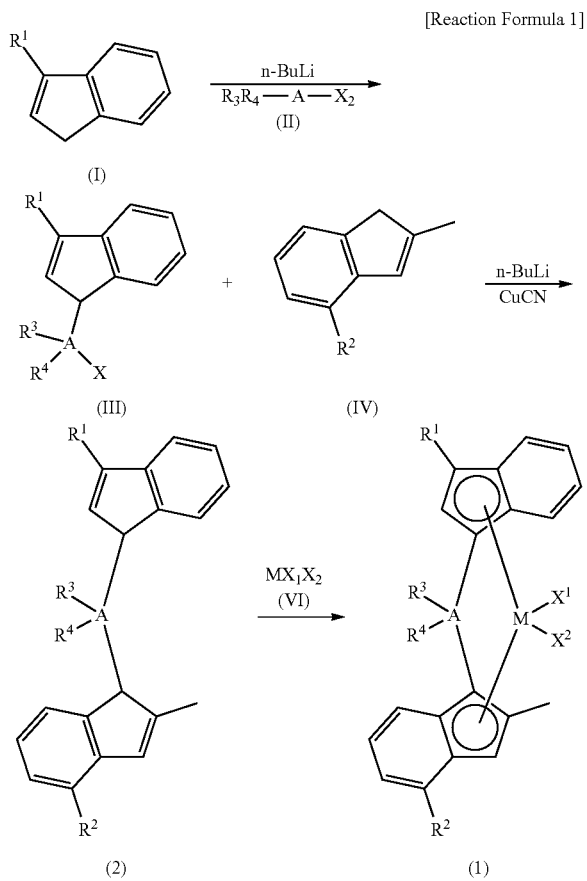

[Reaction Formula 1]

In the above Reaction Formula 1, A, M, R$^1$ to R$^4$, X$^1$, and X$^2$ are as defined above, and X is a halogen group such as chloro.

Each reaction of the above steps may be carried out by applying known reactions, and a more detailed synthesis method may be referred to in the following preparation examples.

Due to the pseudo C2-symmetric structure, the transition metal compound of Chemical Formula 1 may provide a polypropylene which is stereoregular and has a narrow molecular weight distribution, thereby exhibiting excellent impact strength. In addition, the transition metal compound may reduce the amount of TVOC generated in the preparation of a polymer.

Therefore, according to another embodiment of the present disclosure, a catalyst composition including the above transition metal compound is provided.

Specifically, the catalyst composition includes the transition metal compound of Chemical Formula 1 as a single catalyst. As a result, a molecular weight distribution of the polymer to be prepared is remarkably narrowed as compared with the conventional case in which two or more kinds of catalysts are used, so that strength characteristics may be improved.

Further, in the above catalyst composition, the transition metal compound may be used as a single component or in the form of a catalyst supported on a support. When the transition metal compound is used in the form of a supported catalyst, it is possible to further improve morphology and physical properties of the polypropylene to be prepared, and it may be suitably used for slurry polymerization, bulk polymerization, and gas phase polymerization.

Specifically, the support may have a hydroxyl group, a silanol group, or a siloxane group having high reactivity on its surface. The support may be surface-modified by calcination, or may be dried to remove moisture from the surface. For example, the support may be silica prepared by calcining silica gel, silica dried at high temperature, silica-alumina, or silica-magnesia, and it may usually contain oxides, carbonates, sulfates, or nitrates such as Na$_2$O, K$_2$CO$_3$, BaSO$_4$, Mg(NO$_3$)$_2$, and the like.

The support is preferably calcined or dried at 200 to 600° C., more preferably 250 to 600° C. When the temperature is 200° C. or less, the support contains too much moisture, so that the moisture on the surface may react with the cocatalyst. In addition, a cocatalyst supporting ratio may be relatively high due to excess hydroxyl groups, but this requires a large amount of cocatalyst. When the temperature is higher than 600° C., pores on the surface of the support may be combined with each other to reduce the surface area, and many hydroxyl groups or silanol groups may be lost from the surface, leaving only siloxane groups. Thus, reactive sites with the cocatalyst may be reduced, which is not preferable.

The amount of hydroxy groups may be controlled by the preparation method, the preparation conditions, or the drying conditions such as temperature, time, vacuum, or spray drying of the support. When the amount of hydroxyl groups is excessively low, reactive sites with the cocatalyst may be insufficient. When the amount of hydroxyl groups is excessively high, it may be caused by moisture besides the hydroxyl groups present on the surface of support particles, which is not desirable. For example, the amount of hydroxyl groups on the surface may be 0.1 to 10 mmol/g, or 0.5 to 5 mmol/g.

Among the above-mentioned supports, the silica prepared by calcining silica, particularly silica gel, has little catalyst released from the surface of the support in the polymerization process of the propylene, because the transition metal compound is chemically bonded to and supported on the silica support. As a result, when the polypropylene is prepared by slurry polymerization or gas phase polymerization, a fouling phenomenon, sticking to the wall surface of the reactor or with itself, may be minimized.

When the transition metal compound is used in the form of a supported catalyst, the content thereof may be 10 μmol or more, or 30 μmol or more, and 100 μmol or less, or 80 μmol or less, based on a weight of the support, for example, 1 g of silica. When supported within the above content range, the supported catalyst may exhibit appropriate activity, which is advantageous in terms of maintaining catalytic activity and economical efficiency.

In addition, the above catalyst composition may further include a cocatalyst in addition to the transition metal compound and the support in terms of improving the activity and stability. The cocatalyst may include at least one compound represented by the following Chemical Formula 3, 4, or 5.

—[Al(R$_{11}$)—O]$_m$—         [Chemical Formula 3]

In Chemical Formula 3, $R_{11}$ are the same as or different from each other, and each are independently a halogen, a $C_{1-20}$ hydrocarbon, or a $C_{1-20}$ halogen-substituted hydrocarbon; and m is an integer of 2 or more.

$$J(R_{12})_3 \quad \text{[Chemical Formula 4]}$$

In Chemical Formula 4, $R_{12}$ are the same as or different from each other, and are each independently a halogen, a $C_{1-20}$ hydrocarbon, or a $C_{1-20}$ halogen-substituted hydrocarbon; and J is aluminum or boron.

$$[E-H]^+[ZQ_4]^- \text{ or } [E]^+[ZQ_4]^- \quad \text{[Chemical Formula 5]}$$

In Chemical Formula 5,

E is a neutral or cationic Lewis base;

H is a hydrogen atom;

Z is a Group 13 element; and

Q are the same as or different from each other, and are each independently a $C_{6-20}$ aryl or $C_{1-20}$ alkyl group, of which one or more hydrogen atoms are unsubstituted or substituted with a halogen, a $C_{1-20}$ hydrocarbon, alkoxy, or phenoxy.

Examples of the compound represented by Chemical Formula 3 may include a $C_{1-20}$ alkylaluminoxane-based compound such as methylaluminoxane, ethylaluminoxane, isobutylaluminoxane, butylaluminoxane, and the like, and any one or a mixture thereof may be used.

Examples of the compound represented by Chemical Formula 4 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminum ethoxide, trimethylboron, triethylboron, triisobutylboron, tripropylboron, tributylboron, and the like, and a more preferred compound is selected from trimethylaluminum, triethylaluminum, and triisobutylaluminum.

Examples of the compound represented by Chemical Formula 5 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, and the like, and any one or a mixture thereof may be used.

In order to exhibit better catalytic activity when used with the transition metal compound, the cocatalyst may be the compound represented by the Chemical Formula more specifically the $C_{1-20}$ alkylaluminoxane-based compound such as methylaluminoxane. The alkylaluminoxane-based compound acts as a scavenger of a hydroxyl group present on the surface of the support to improve the catalytic activity and to convert the halogen group of the catalyst precursor to a methyl group, thereby promoting chain growth in the polymerization of a polypropylene.

The cocatalyst may be supported in an amount of 8 mmol or more, or 10 mmol or more, and 25 mmol or less, or 20 mmol or less based, on a weight of the support, for example, 1 g of silica. When supported within the above content range, it is possible to obtain an effect of improving catalytic activity as well as an effect of reducing the generation of fine particles.

The catalyst composition may further include an antistatic agent. An ethoxylated alkylamine represented by the following Chemical Formula 6 may be used as the antistatic agent, and any component known to be an antistatic agent may be used without limitation. When the catalyst composition includes the antistatic agent, the generation of static electricity in the polymerization of a polypropylene may be reduced, and physical properties of the polypropylene to be prepared may be further improved.

$$R^7N-(CH_2CH_2OH)_2 \quad \text{[Chemical Formula 6]}$$

In Chemical Formula 6, $R^7$ may be $C_{8-30}$ alkyl. When $R^7$ contains an alkyl group having the carbon number within the above range, the antistatic agent may exhibit an effect of reducing the generation of fine particles by an excellent antistatic function without causing an unpleasant odor.

More specifically, the ethoxylated alkylamine may be a compound in which $R^7$ of Chemical Formula 6 is a $C_{8-22}$ linear alkyl, a $C_{12-18}$ linear alkyl, or a $C_{13-15}$ linear alkyl, and any one or a mixture thereof may be used. Further, commercially available ATMER™ 163 (manufactured by CRODA), and the like may be used.

When the antistatic agent is further included, it may be contained in an amount of 1 to 10 g, more specifically, 1 to 5 g, based on 100 g of the support.

When the catalyst composition includes the support, the cocatalyst and the antistatic agent, the catalyst composition may be prepared by a method including the steps of: supporting a cocatalyst on a support; supporting the transition metal compound on the support; and injecting an antistatic agent in the form of a slurry into the support where the cocatalyst and the transition metal compound are supported and then heat-treating the same. The supported catalyst having a structure determined according to the above supporting order may exhibit superior catalytic activity and excellent process stability in the preparation of a polypropylene.

The catalyst composition may be used in a slurry state or in a diluted state in a solvent, or in the form of a mud catalyst mixed with a mixture of oil and grease depending on the polymerization method.

When used in a slurry state or in a diluted state in solvent, the solvent may be an aliphatic hydrocarbon solvent having 5 to 12 carbon atoms such as pentane, hexane, heptane, nonane, decane, and an isomer thereof, an aromatic hydrocarbon solvent such as toluene and benzene, or a hydrocarbon solvent substituted with chlorine such as dichloromethane and chlorobenzene, which is suitable for the polymerization of propylene monomers. Any one or a mixture thereof may be used. In this case, the catalyst composition may further include the above-mentioned solvent, and a small amount of water or air, which can act as a catalyst poison, may be removed by treating the solvent with a small amount of alkylaluminum in advance.

In addition, when a continuous bulk polymerization method is used, the catalyst composition may be used in the form of a mud catalyst mixed with a mixture of oil and grease. In this case, the amount of the volatile organic compounds contained in the homo polypropylene to be prepared may be further reduced as compared with the case where the catalyst composition used is dissolved or diluted in a solvent, and as a result, the odor due to the volatile organic compound may also be reduced.

The above-described catalyst composition may reduce the amount of TVOC generated in the preparation of a homo polypropylene and may increase impact strength.

According to another embodiment of the present disclosure, a method for preparing a homo polypropylene using a catalyst composition including the transition metal compound of Chemical Formula 1, and a polypropylene prepared thereby, are provided.

Specifically, the method for preparing a polypropylene includes a step of polymerizing propylene monomers by introducing hydrogen in the presence of the catalyst composition including the transition metal compound of Chemical Formula 1.

In the method for preparing a homo polypropylene, the polymerization process may be carried out by contacting the catalyst composition with propylene under hydrogen gas.

Herein, the hydrogen gas may be introduced in an amount of 50 to 700 ppm based on a total weight of the propylene monomers. When the hydrogen gas is used within the above range, catalytic activity may be increased and physical properties of the polypropylene to be prepared may be appropriately controlled, such as a narrowed molecular weight distribution, thereby improving processability and increasing strength characteristics. More specifically, the hydrogen gas may be introduced in an amount of 70 ppm or more, or 100 ppm or more, and 500 ppm or less, or 300 ppm or less.

The homo polypropylene may be prepared by a continuous polymerization process. For example, various polymerization processes known for the polymerization of olefinic monomers such as a continuous solution polymerization process, a bulk polymerization process, a suspension polymerization process, a slurry polymerization process, or an emulsion polymerization process may be applied. Particularly, a bulk-slurry polymerization process is preferable in order to obtain a uniform molecular weight distribution and to produce commercial products.

The polymerization reaction may be carried out at a temperature of 40° C. or higher, or 60° C. or higher, and 110° C. or lower, or 100° C. or lower, and under a pressure of 1 kgf/cm$^2$ or higher, or 30 kgf/cm$^2$ or higher, and 100 kgf/cm$^2$ or lower, or 50 kgf/cm$^2$ or lower.

In addition, a trialkylaluminum such as triethylaluminum may be selectively added during the polymerization reaction.

When moisture or impurities are present in the polymerization reactor, a part of the catalyst decomposes. Since the trialkylaluminum acts as a scavenger which preliminarily captures moisture or impurities present in the reactor or moisture contained in the monomer, activity of the catalyst used in the preparation may be maximized, and as a result, a homo polypropylene having excellent properties such as a narrow molecular weight distribution can be prepared more efficiently. Specifically, an alkyl of the above-mentioned trialkylaluminum is as defined above, and may be a $C_{1-20}$ alkyl, more specifically a $C_{1-6}$ linear or branched alkyl, such as methyl, ethyl, isobutyl, and the like.

The trialkylaluminum (based on 1 M) may be added in an amount of 300 ppm or more, or 400 ppm or more, and 600 ppm or less, or 450 ppm or less, based on a total weight of the propylene monomers. A homo polypropylene having excellent strength properties may be more easily prepared in the polymerization reaction in the presence of trialkylaluminum within the above-mentioned range.

The homo polypropylene according to an embodiment of the present disclosure prepared by the above-described method may exhibit increased strength characteristics as well as excellent processability.

Specifically, the homo polypropylene has a low melting temperature (Tm) of 145° C. or less and may exhibit excellent processability, thereby lowering the processing temperature in the process using the homo polypropylene. Therefore, energy can be saved and blending may be facilitated.

In the present disclosure, the melting temperature or melting point may be measured using differential scanning calorimetry (DSC). Specifically, the temperature of the homo polypropylene is increased to 200° C., and maintained at that temperature for 5 minutes. After that, the temperature is decreased to 30° C., and further increased. The temperature at the top of a DSC (Differential Scanning calorimeter, manufactured by TA) curve is referred to as the melting point. Herein, the temperature is increased and decreased at a rate of 10° C./min, respectively, and the melting point is confirmed in the second heating period.

The homo polypropylene prepared by the above method has a high weight average molecular weight of 340,000 g/mol or more and a melt index of 7 g/10 min or less (measured at 230° C. under a load of 2.16 kg according to ASTM D1238) under a hydrogen input of 100 ppm. Thus, it is possible to prepare a wide range of grades by controlling the input amount of hydrogen gas.

The homo polypropylene prepared by the above method exhibits a narrow molecular weight distribution of 2.7 or less in addition to the above-described melting temperature, melt index, and weight average molecular weight. As a result, the homo polypropylene may exhibit excellent rigidity and impact strength characteristics.

Meanwhile, the weight average molecular weight (Mw) and the molecular weight distribution (MWD) of the homo polypropylene may be measured using gel permeation chromatography (GPC). The MWD may be determined by measuring the weight average molecular weight (Mw) and the number average molecular weight (Mn), and then calculating a ratio of the weight average molecular weight to the number average molecular weight (Mw/Mn). Specifically, it can be measured using a Polymer Laboratories PLgel MIX-B 300 mm long column and a PL-GPC220 instrument manufactured by Waters, at an evaluation temperature of 160° C. 1,2,4-trichlorobenzene is used for a solvent and the flow rate is 1 mL/min. Further, a sample with a concentration of 10 mg/10 mL is supplied in an amount of 200 μL. Mw and Mn are obtained using a calibration curve formed using a polystyrene standard. 9 kinds of the polystyrene standard are used with the molecular weight (g/mol) of 2000/10,000/30,000/70,000/200,000/700,000/2,000,000/4,000,000/10,000,000.

As described above, the homo polypropylene according to an embodiment of the present disclosure has the low melting temperature, the low melt index, the narrow molecular weight distribution, and the high weight average molecular weight. Accordingly, it is possible to exhibit excellent melting processability when molding into various products, and to exhibit improved mechanical properties such as high impact strength and the like.

According to another embodiment of the present disclosure, a molded product including the homo polypropylene is provided. The product can be produced according to a conventional method except that the homo polypropylene of the embodiment described above is used.

Hereinafter, preferred examples will be described in order to facilitate understanding of the present invention. However, these examples are only provided to facilitate understanding of the present invention, and the invention is not intended to be limited thereto.

<Preparation of Transition Metal Compound>

Preparation Example 1-1

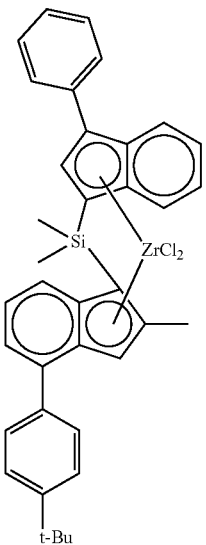

Step 1: Preparation of dimethylsilanediyl(3-phenyl-1H-inden-1-yl)(2-methyl-4-(4-tert-butylphenyl)-1H-indene)

1 eq of 3-phenyl-1H-indene was dissolved in a mixed solution of toluene/THF (10/1 by volume, 0.5 M), and n-BuLi (1.05 eq) was slowly added dropwise thereto at −25° C., followed by stirring at room temperature for 3 hours. Dichlorodimethyl silane (1.05 eq) was added to the reaction product at −10° C., and stirred overnight at room temperature to prepare a mono-Si solution.

In another reactor, 2-methyl-4-(4-tert-butylphenyl)indene (1 eq) was dissolved in a mixed solution of toluene/THF (5/1 by volume, 0.7 M), and n-BuLi (1.05 eq) was slowly added dropwise thereto at −25° C., followed by stirring at room temperature for 3 hours. CuCN (2 mol %) was added to the reaction product and stirred for 30 minutes, and then the mono-Si solution was added thereto. Thereafter, it was stirred overnight at room temperature, worked up with water, and dried to obtain a ligand.

Step 2: Preparation of dimethylsilanediyl(3-phenyl-1H-inden-1-yl)(2-methyl-4-(4-tert-butylphenyl)-1H-inden-1-yl)zirconium dichloride The ligand prepared above was dissolved in a mixed solution of toluene/diethyl ether (2/1 by volume, 0.53 M), and n-BuLi (2.05 eq) was added at −25° C., followed by stirring at room temperature for 5 hours. A slurry prepared by mixing $ZrCl_4$ (1 eq) with toluene (0.17 M) in a separate flask was added at −25° C. to the reaction product, and stirred overnight at room temperature.

When the reaction was completed, the solvent was vacuum-dried, and dichloromethane (DCM) was added again. Subsequently, LiCl was removed through a filter, the filtrate was vacuum-dried, and DCM/hexane was added thereto, followed by recrystallization at room temperature. The resulting solid was filtered and vacuum-dried to obtain the transition metal compound as a solid.

Pseudo-rac: 7.72 (dd, 2H), 7.56 (d, 2H), 7.5-6.7 (m, 12H), 6.61 (s, 1H), 6.07 (s, 1H), 2.15 (s, 3H), 1.46 (5, 3H), 1.3 (s, 9H), 1.07 (s, 3H) ppm Preparation Example 1-2

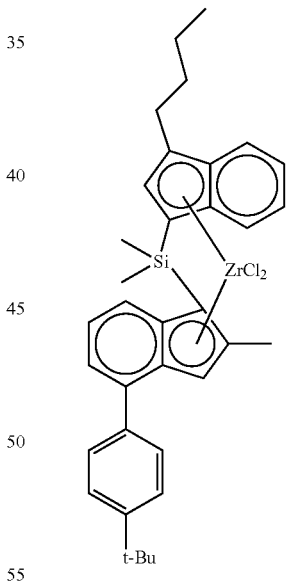

Dimethylsilanediyl(3-n-butyl-1H-inden-1-yl)(2-methyl-4-(4-tert-butylphenyl)-1H-inden-1-yl) zirconium dichloride was prepared in the same manner as in Preparation Example 1-1, except that 3-n-butyl-1H-indene was used instead of 3-phenyl-1H-indene in Step 1.

Pseudo-rac: 7.57 (d, 1H), 7.4-6.8 (m, 10H), 6.61 (s, 1H), 5.67 (s, 1H), 2.86 (t, 2H), 2.16 (s, 3H), 1.58 (m, 2H), 1.42 (s, 3H), 1.33 (s, 9H), 1.4-1.2 (m, 2H), 1.03 (s, 3H), 0.92 (t, 3H) ppm

Preparation Example 1-3

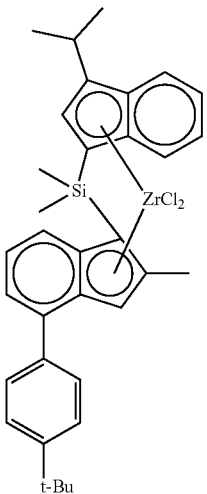

Dimethylsilanediyl(3-iso-propyl-1H-inden-1-yl)(2-methyl-4-(4-tert-butylphenyl)-1H-inden-1-yl) zirconium dichloride was prepared in the same manner as in Preparation Example 1-1, except that 3-iso-propyl-1H-indene was used instead of 3-phenyl-1H-indene in Step 1.

Pseudo-rac: 7.58 (d, 1H), 7.3-6.8 (m, 10H), 6.6 (5, 1H), 5.69 (s, 1H), 2.41 (m, 1H), 1.42 (s, 3H), 1.33 (s, 9H), 1.01 (d, 6H), 0.82 (s, 6H) ppm

Preparation Example 1-4

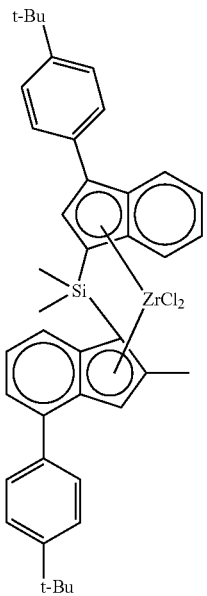

Dimethylsilanediyl(3-(4-t-butylphenyl)-1H-inden-1-yl)(2-methyl-4-(4-tert-butylphenyl)-1H-inden-1-yl) zirconium dichloride was prepared in the same manner as in Preparation Example 1-1, except that 3-(4-t-butylphenyl)-1H-indene was used instead of 3-phenyl-1H-indene in Step 1.

Pseudo-rac: 7.58 (d, 1H), 7.4-6.7 (m, 14H), 6.72 (s, 1H), 6.12 (s, 1H), 1.42 (s, 3H), 1.33 (s, 18H), 0.83 (s, 6H) ppm

Preparation Example 1-5

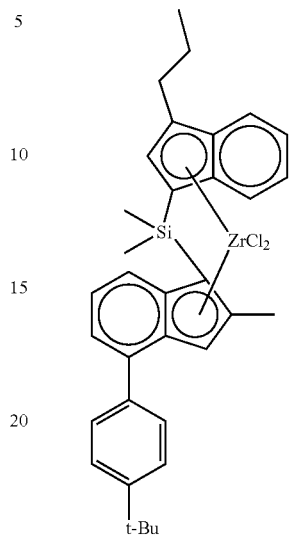

Dimethylsilanediyl(3-n-propyl-1H-inden-1-yl)(2-methyl-4-(4-tert-butylphenyl)-1H-inden-1-yl) zirconium dichloride was prepared in the same manner as in Preparation Example 1-1, except that 3-n-propyl-1H-indene was used instead of 3-phenyl-1H-indene in Step 1.

Pseudo-rac: 7.55 (d, 1H), 7.4-6.8 (m, 10H), 6.60 (s, 1H), 5.65 (s, 1H), 2.21 (t, 2H), 2.16 (s, 3H), 1.42 (s, 3H), 1.33 (m, 11H), 1.03 (s, 6H), 0.92 (t, 3H) ppm

Comparative Preparation Example 1-1

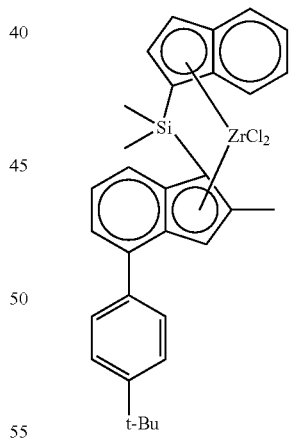

Step 1: Preparation of dimethylsilanediyl(H-inden-1-yl)(2-methyl-4-(4-tert-butylphenyl)-1H-indene)

1 eq of 3-n-butyl-1H-indene was dissolved in a mixed solution of toluene/THF (10/1 by volume, 0.5 M), and n-BuLi (1.05 eq) was slowly added dropwise thereto at −25° C., followed by stirring at room temperature for 3 hours. Dichlorodimethyl silane (1.05 eq) was added to the reaction product at −10° C., and stirred overnight at room temperature to prepare a mono-Si solution.

In another reactor, 2-methyl-4-(4-tert-butylphenyl)indene (1 eq) was added to a mixed solution of toluene/THF (5/1 by volume, 0.7 M), and n-BuLi (1.05 eq) was slowly added dropwise thereto at −25° C., followed by stirring at room temperature for 3 hours. CuCN (2 mol %) was added to the reaction product and stirred for 30 minutes, and then the mono-Si solution was added thereto. Thereafter, it was stirred overnight at room temperature, worked up with water, and dried to obtain a ligand.

Step 2: Preparation of dimethylsilanediyl(1H-inden-1-yl)(2-methyl-4-(4-tert-butylphenyl)-1H-inden-1-yl)zirconium dichloride The ligand prepared above was dissolved in a mixed solution of toluene/diethyl ether (2/1 by volume, 0.53 M), and n-BuLi (2.05 eq) was added at −25° C., followed by stirring at room temperature for 5 hours. A slurry prepared by mixing ZrCl₄ (1 eq) with toluene (0.17 M) in a separate flask was added at −25° C. to the reaction product, and stirred overnight at room temperature.

When the reaction was completed, the solvent was vacuum-dried, and dichloromethane (DCM) was added again. Subsequently, LiCl was removed through a filter, the filtrate was vacuum-dried, and DCM/hexane was added thereto, followed by recrystallization at room temperature. The resulting solid was filtered and vacuum-dried to obtain the transition metal compound as a solid.

Pseudo-rac: 7.6-6.8 (m, 13H), 6.2 (d, 1H), 2.6, 2.5 (m, 1H), (s, 9H), 1.4, 1.3 (s, 3H) ppm.

Comparative Preparation Example 1-2

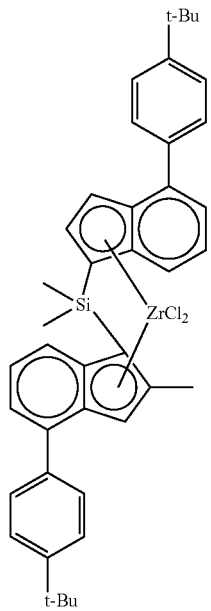

Step 1: Preparation of 4-(4-tert-butylphenyl)-1H-indene)

7-bromo-1H-indene (1 eq), 4-t-Bu-Ph-B(OH)₂ (1.2 eq), Pd(PPh₃)₄ (5 mol %, based on 1 eq of 7-bromo-1H-indene), and Na₂CO₃ (2.5 eq) were placed in a flask, and toluene/EtOH/H₂O (2/1/1 by volume, 0.3 M) was added thereto, followed by stirring at 80° C. for 12 hours. After work-up with water, it was dried and recrystallized using MeOH.

Step 2: Preparation of dimethylsilanediyl(4-(4-tert-butylphenyl)-1H-inden-1-yl)(2-methyl-4-(4-tert-butylphenyl)-1H-indene)

1 eq of the 4-(4-tert-butylphenyl)-1H-indene prepared above was dissolved in a mixed solution of toluene/THF (10/1 by volume, 0.5 M), and n-BuLi (1.05 eq) was slowly added dropwise thereto at −25° C., followed by stirring at room temperature for 3 hours. Dichlorodimethyl silane (1.05 eq) was added thereto at −10° C., and stirred overnight at room temperature to prepare a mono-Si solution.

In another reactor, 2-Me-4-(4-t-BuPh)indene (1 eq) was dissolved in a mixed solution of toluene/THF (5/1 by volume, 0.7 M), and n-BuLi (1.05 eq) was slowly added dropwise thereto at −25° C., followed by stirring at room temperature for 3 hours. CuCN (2 mol %) was added to the reaction product and stirred for 30 minutes, and then the mono-Si solution was added thereto. Thereafter, it was stirred overnight at room temperature, worked up with water, and dried to obtain a ligand.

Step 3: Preparation of dimethylsilanediyl(4-(4-tert-butylphenyl)-1H-inden-1-yl)(2-methyl-4-(4-tert-butylphenyl)-1H-inden-1-yl)zirconium dichloride The ligand prepared above was dissolved in a mixed solution of toluene/diethyl ether (2/1 by volume, 0.53 M), and n-BuLi (2.05 eq) was added at −25° C., followed by stirring at room temperature for 5 hours. A slurry prepared by mixing ZrCl₄ (1 eq) with toluene (0.17 M) in a separate flask was added at −25° C. to the reaction product, and stirred overnight at room temperature.

When the reaction was completed, the solvent was vacuum-dried, and dichloromethane (DCM) was added again. Subsequently, LiCl was removed through a filter, the filtrate was vacuum-dried, and DCM/hexane was added thereto, followed by recrystallization at room temperature. The resulting solid was filtered and vacuum-dried to obtain the transition metal compound as a solid.

Pseudo-rac: 7.6-6.7 (m, 16H), 5.91 (d, 1H), 2.11 (s, 3H), 1.25, 1.20 (s, 9H), 1.41, 1.11 (s, 3H) ppm.

Comparative Preparation Example 1-3

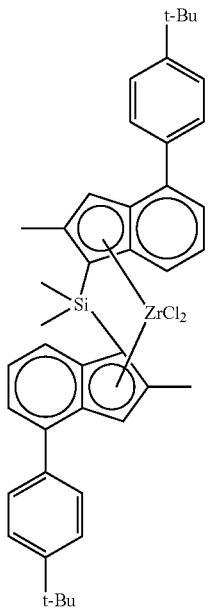

Dimethylsilanediylbis(2-methyl-4-(4-tert-butylphenyl)-1H-inden-1-yl) zirconium dichloride was prepared in the same manner as in Comparative Preparation Example 1-2, except that 7-bromo-2-methyl-1H-indene was used instead of 7-bromo-1H-indene in Step 1.

Pseudo-rac: 7.64 (d, 2H), 7.57 (d, 4H), 7.45 (d, 4H), 7.38 (d, 2H), 7.11 (t, 2H), 7.0 (a, 2H), 2.25 (s, 6H), 1.33 (s, 24H) ppm.

Comparative Preparation Example 1-4

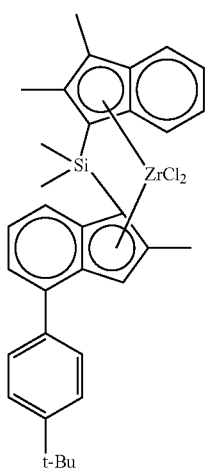

Step 1: Preparation of 7-(4'-tert-butylphenyl)-2-methyl-1-indanone 7-bromo-2-methyl-1-indanone (1 eq), 4-tBu-Ph-B(OH)$_2$ (1.2 eq), Pd(PPh$_3$)$_4$ (5 mol %), and Na$_2$CO$_3$ (2.5 eq) were placed in a flask, and toluene/EtOH/H$_2$O (2/1/1 by volume, 0.3 M) was added thereto, followed by stirring at 80° C. for 12 hours. After work-up with water, it was dried and recrystallized using MeOH.

Step 2: Preparation of 7-(4'-tert-butylphenyl)-1,2-dimethyl-1H-indene

Mg turnings (5 eq) were placed in a flask, Et$_2$O (5 M) was added thereto, and then a small amount of MeI was added thereto. The resulting mixed solution was slowly warmed up to start reflux. When the reflux started, a solution of MeI (5 eq) dissolved in Et$_2$O (1 M) was slowly added dropwise. After reacting for 1 hour, it was cooled down to 0° C.

A solution of 7-(4'-tert-butylphenyl)-2-methyl-1-indanone (1 eq) dissolved in Et$_2$O (0.8 M) in a separate flask was added dropwise for 30 minutes to the flask which was cooled down to 0° C. After stirring for 15 minutes, the temperature was gradually raised to room temperature and 6 N HCl (0.5 M) was added dropwise. After stirring for 30 minutes, it was extracted with water and Et$_2$O. The organic layer was dried and then recrystallized using MeOH to prepare 7-(4'-tert-butylphenyl)-1,2-dimethyl-1H-indene.

Step 3: Preparation of dimethylsilanediyl(2,3-dimethyl-1H-inden-1-yl)(2-methyl-4-(4-tert-butylphenyl)-1H-indene)

1 eq of 2,3-dimethyl-1H-indene was dissolved in a mixed solution of toluene/THF (10/1 by volume, 0.5 M), and n-BuLi (1.05 eq) was slowly added dropwise thereto at −25 followed by stirring at room temperature for 3 hours. Dichlorodimethyl silane (1.05 eq) was added thereto at −10° C., and stirred overnight at room temperature to prepare a mono-Si solution.

In another reactor, 2-Me-4-(4-tBuPh)indene (1 eq) was dissolved in a mixed solution of toluene/THF (5/1 by volume, 0.7 M), and n-BuLi (1.05 eq) was slowly added dropwise thereto at −25° C., followed by stirring at room temperature for 3 hours. CuCN (2 mol %) was added to the reaction product and stirred for 30 minutes, and then the mono-Si solution was added thereto. Thereafter, it was stirred overnight at room temperature, worked up with water, and dried to obtain a ligand.

Step 4: Preparation of dimethylsilanediyl(2,3-dimethyl-1H-inden-1-yl)(2-methyl-4-(4-tert-butylphenyl)-1H-inden-1-yl)zirconium dichloride The ligand prepared above was dissolved in a mixed solution of toluene/diethyl ether (2/1 by volume, 0.53 M), and n-BuLi (2.05 eq) was added at −25 followed by stirring at room temperature for 5 hours. A slurry prepared by mixing ZrCl$_4$ (1 eq) with toluene (0.17 M) in a separate flask was added at −25° C. to the reaction product, and stirred overnight at room temperature.

When the reaction was completed, the solvent was vacuum-dried, and dichloromethane (DCM) was added again. Subsequently, LiCl was removed through a filter, the filtrate was vacuum-dried, and then DCM/hexane was added thereto, followed by recrystallization at room temperature. The resulting solid was filtered and vacuum-dried to obtain the transition metal compound as a solid.

Pseudo-rac: 7.6-6.8 (m, 11H), 6.36 (s, 1H), 2.12 (s, 3H), 1.94 (s, 3H), 1.69 (s, 3H), 1.33 (s, 9H), 1.32 (s, 6H) ppm.

Comparative Preparation Example 1-5

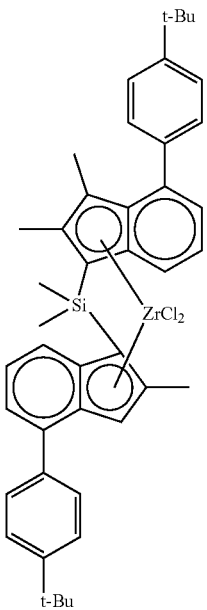

Dimethylsilanediyl(2,3-dimethyl-4-(4-tert-butylphenyl)-1H-inden-1-yl)(2-methyl-4-(4-tert-butylphenyl)-1H-inden-1-yl) zirconium dichloride was prepared in the same manner as in Comparative Preparation Example 1-4, except that 2,3-dimethyl-4-(4-butylphenyl)-1H-indene was used instead of 2,3-dimethyl-1H-indene in Step 3.

Pseudo-rac: 7.67-6.99 (m, 14H), 6.97 (s, 1H), 2.25 (s, 3H), 1.97 (s, 3H), 1.67 (s, 3H), 1.34 (s, 9H), 1.33 (s, 6H), 1.31 (s, 9H) ppm.

Comparative Preparation Example 1-6

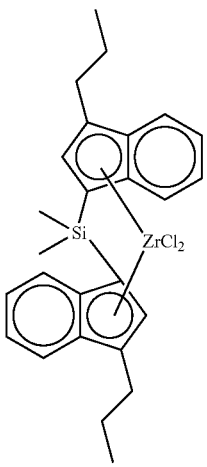

Step 1: Preparation of dimethylsilanediyl bis(3-propyl-1H-indene)

1 eq of 3-propyl-1H-indene was dissolved in a mixed solution of toluene/THF (10/1 by volume, 0.5 M), and n-BuLi (1.05 eq) was slowly added dropwise thereto at −25° C., followed by stirring at room temperature for 3 hours. CuCN (2 mol %) was added thereto, and stirred for 30 minutes. Then, dichlorodimethyl silane (0.5 eq) was added thereto at −10° C., and stirred overnight at room temperature. Thereafter, it was worked up with water and dried to obtain a ligand.

Step 2: Preparation of dimethylsilanediyl bis-(3-propyl-inden-1-yl)zirconium dichloride The ligand prepared above was dissolved in a mixed solution of toluene/ether (2/1 by volume, 0.53 M), and n-BuLi (2.05 eq) was added at −25° C., followed by stirring at room temperature for 5 hours. A slurry prepared by mixing $ZrCl_4$ (1 eq) with toluene (0.17 M) was added to the flask, and stirred overnight at room temperature.

When the reaction was completed, the solvent was vacuum-dried, and dichloromethane (DCM) was added again. Subsequently, LiCl was removed through a filter or the like, the filtrate was vacuum-dried, and then DCM/hexane was added thereto, followed by recrystallization at room temperature. The resulting solid was filtered and vacuum-dried to obtain the transition metal compound as a solid.

Pseudo-rac: 7.41-7.32 (m, 6H), 7.21 (t, 2H), 6.17 (s, 2H), 2.01 (s, 4H), 1.41-1.33 (m, 4H), 1.09 (t, 6H), 1.03 (s, 6H) ppm

Comparative Preparation Example 1-7

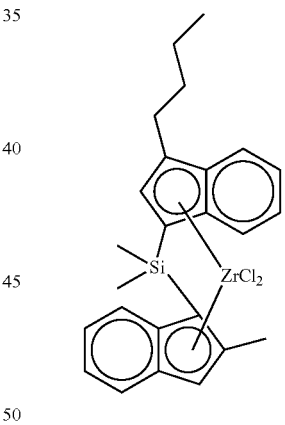

Step 1: Preparation of dimethylsilanediyl(3-butyl-1H-inden-1-yl)(2-methyl-1H-indene)

1 eq of 3-butyl-1H-indene was dissolved in a mixed solution of toluene/THF (10/1 by volume, 0.5 M), and n-BuLi (1.05 eq) was slowly added dropwise thereto at −25° C., followed by stirring at room temperature for 3 hours. Dichlorodimethyl silane (1.05 eq) was added thereto at −10° C., and stirred overnight at room temperature. In another reactor, 2-Me-1-H-indene (1 eq) was dissolved in a mixed solution of toluene/THF (5/1 by volume, 0.7 M), and n-BuLi (1.05 eq) was slowly added dropwise thereto at −25° C., followed by stirring at room temperature for 3 hours. CuCN (2 mol %) was added thereto and stirred for 30 minutes. Then, the mono-Si solution, the first reaction product, was added thereto. Thereafter, it was stirred overnight at room temperature, worked up with water, and dried to obtain a ligand.

Step 2: Preparation of dimethylsilanediyl(3-butyl-1H-inden-1-yl)(2-methyl-1H-inden-1-yl)zirconium dichloride The ligand prepared above was dissolved in a mixed solution of toluene/ether (2/1 by volume, 0.53 M), and n-BuLi (2.05 eq) was added at −25° C., followed by stirring at room temperature for 5 hours. A slurry prepared by mixing $ZrCl_4$ (1 eq) with toluene (0.17 M) was added to the flask, and stirred overnight at room temperature.

When the reaction was completed, the solvent was vacuum-dried, and dichloromethane (DCM) was added again. Subsequently, LiCl was removed through a filter or the like, the filtrate was vacuum-dried, and then DCM/hexane was added thereto, followed by recrystallization at room temperature. The resulting solid was filtered and vacuum-dried to obtain the transition metal compound as a solid.

Pseudo-rac: 7.38-7.31 (m, 6H), 7.21-7.23 (m, 2H), 6.41 (s, 1H), 6.17 (s, 1H), 1.93 (t, 2H), 1.82 (s, 3H), 1.48-1.39 (m, 4H), 1.32 (t, 3H), 1.03 (s, 6H), ppm Comparative Preparation Example 1-8

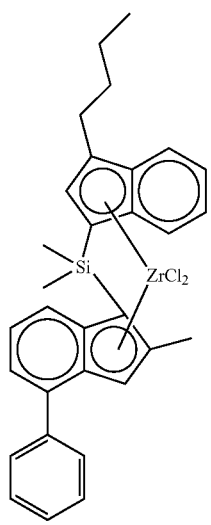

Dimethylsilanediyl(3-n-butyl-1H-inden-1-yl)(2-methyl-4-phenyl-1H-inden-1-yl) zirconium dichloride was prepared in the same manner as in Preparation Example 1-1, except that 3-n-butyl-1H-indene was used instead of 3-phenyl-1H-indene and 2-methyl-4-phenylindene was used instead of 2-methyl-4-(4-tert-butylphenyl)indene in Step 1.

Pseudo-rac: 7.58 (d, 1H), 7.5-6.8 (m, 11H), 6.61 (s, 1H), 5.68 (s, 1H), 2.86 (t, 2H), 2.18 (s, 3H), 1.59 (m, 2H), 1.43 (s, 3H), 1.4-1.2 (m, 2H), 1.05 (s, 3H), 0.93 (t, 3H) ppm <Preparation of Supported Metallocene Catalyst>

Preparation Example 2-1

Silica gel (SYLOPOL 952™, calcinated under 250° C., 100 g) was placed in a 2 L reactor under an Ar atmosphere, and 766 mL of a 10 wt % methylaluminoxane (MAO) toluene solution (corresponding to 10 mmol per 1 g of silica) was slowly added thereto at room temperature, followed by stirring at 90° C. for 15 hours. After completion of the reaction, it was cooled down to room temperature and allowed to stand for 15 minutes to decant the solvent using a cannula. After adding 400 mL of toluene and stirring for 1 minute, the mixture was allowed to stand for 15 minutes to decant the solvent using a cannula. 700 μmol of the transition metal compound prepared in Preparation Example 1-1 was dissolved in 400 mL of toluene, and transferred to the reactor using a cannula. After stirring at 50° C. for 5 hours, it was cooled down to room temperature and allowed to stand for 15 minutes to decant the solvent using a cannula. After adding 400 mL of toluene and stirring for 1 minute, the mixture was allowed to stand for 15 minutes to decant the solvent using a cannula. This process was repeated twice, hi the same manner, 400 mL of hexane was added thereto, stirred for 1 minute, and then allowed to stand for 15 minutes to decant the solvent using a cannula. Subsequently, an antistatic agent (Atmer 163™, 3 g, manufactured by CRODA) was dissolved in 400 mL of hexane and transferred to the reactor using a cannula. It was stirred at room temperature for 20 minutes, and transferred to a glass filter to remove the solvent. It was dried at room temperature under vacuum for 5 hours, and then dried at 45° C. under vacuum for 4 hours to obtain a supported catalyst.

Preparation Examples 2-2 to 2-5, and Comparative Preparation Examples 2-1 to 2-8

A supported metallocene catalyst was prepared in the same manner as in Preparation Example 2-1, except that one of the transition metal compounds prepared in Preparation Examples 1-2 to 1-5, and Comparative Preparation Examples 1-1 to 1-8, was used instead of the transition metal compound prepared in Preparation Example 1-1.

<Preparation of Homo Polypropylene>

Example 1

A 2 L stainless steel reactor was vacuum-dried at 65° C., and cooled down. 450 ppm of triethylaluminum (1 M solution in hexane) was placed in the reactor at room temperature, 100 ppm of hydrogen gas was injected, and then 770 g of propylene was added. After stirring for 10 minutes, 20 mg of the supported metallocene catalyst prepared in Preparation Example 2-1 and 20 mL of hexane were added to the reactor in a slurry form under a nitrogen pressure. After the reactor temperature was gradually raised to 70° C., the polymerization was carried out for 1 hour. After completion of the reaction, unreacted propylene was ventilated.

Examples 2 to 5, and Comparative Examples 1 to 8

A homo polypropylene was prepared in the same manner as in Example 1, except that one of the supported metallocene catalysts prepared in Preparation Examples 2-2 to 2-5, and Comparative Preparation Examples 2-1 to 2-8, was used instead of the supported metallocene catalyst prepared in Preparation Example 2-1.

Experimental Example 1

The activity of the supported metallocene catalysts used in the examples and comparative examples, and physical properties of the homo polypropylene, were evaluated in the following manner. The results are shown in Table 1 below.

(1) Activity (kg PP/g cat·h): The activity was calculated by a ratio of the weight of the prepared polymer (kg PP) to the mass of the used supported catalyst (g) per unit time (h).

(2) Melting point (Tm, ° C.): The temperature of the homo polypropylene was increased to 200° C., and maintained at that temperature for 5 minutes. After that, the temperature was lowered to 30 and further increased. The temperature at the top of the DSC (Differential Scanning calorimeter, manufactured by TA) curve was referred to as the melting point. Herein, the temperature was increased and lowered at a rate of 10° C./min, respectively, and the melting point was confirmed at the second heating period.

(3) Melt index (MI, g/10 min): The melt index was measured at 230° C. under a load of 2.16 kg according to ASTM D1238, and expressed as the weight (g) of the polymer that had been melted for 10 minutes.

(4) Weight average molecular weight (Mw, g/mol) and molecular weight distribution (MWD, polydispersity index): The weight average molecular weight (Mw) and the number average molecular weight (Mn) were measured using gel permeation chromatography (GPC), and the molecular weight distribution was calculated by Mw/Mn. Specifically, it was measured using a Polymer Laboratories PLgel MIX-B 300 mm long column and a PL-GPC220 instrument manufactured by Waters. Herein, the evaluation temperature was 160° C., 1,2,4-trichlorobenzene was used for a solvent, and the flow rate was 1 mL/min. The sample with a concentration of 10 mg/10 mL was supplied in an amount of 200 μL. Mw and Mn were obtained using a calibration curve formed using a polystyrene standard. 9 kinds of the polystyrene standard were used with the molecular weight (g/mol) of 2000/10,000/30,000/70,000/200,000/700,000/2,000,000/4,000,000/10,000,000.

processing temperature in the preparation of molded products using the homo polypropylene. Further, blending may be facilitated to improve the processability.

The homo polypropylenes of Examples 1 to 5 exhibited a high Mw of 340,000 g/mol or more and a low MI of 7 g/10 min or less by introducing hydrogen gas during the polymerization reaction. From this, it can be seen that a wide range of grades may be prepared by controlling the input amount of hydrogen gas.

In addition, the homo polypropylenes of Examples 1 to 5 exhibited a narrow MWD of 2.7 or less as well as the physical properties described above, so that excellent rigidity and impact strength characteristics can be expected.

On the other hand, in the case of Comparative Examples 1 to 8, the activity of the catalyst used in the preparation of the polymer was extremely low, and the Mw of the polymer prepared by introducing the same amount of hydrogen gas during the polymerization was also low.

In particular, the polymer of Comparative Example 1 prepared using the catalyst of Comparative Preparation Example 2-1 in which the first ligand structure of the transition metal compound was unsubstituted had a greatly increased MI and a greatly decreased Mw, as compared with Examples 1 to 5 and Comparative Examples 2 to 5 prepared using the transition metal compound in which at least one hydrogen was substituted in the first ligand. From these results, it can be seen that the substitution in the first ligand affects the physical properties of the polymer, particularly MI and Mw.

In addition, the polymer of Comparative Example 2 prepared using the transition metal compound in which the position 4 in the first ligand was substituted had a similar MWD, but an increased Tm, a greatly increased MI, and a greatly decreased Mw, as compared with Example 4 pre-

TABLE 1

| | Examples | | | | | Comparative Examples | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Supported catalyst | Prep. Ex. 2-1 | Prep. Ex. 2-2 | Prep. Ex. 2-3 | Prep. Ex. 2-4 | Prep. Ex. 2-5 | Comp. Prep. Ex. 2-1 | Comp. Prep. Ex. 2-2 | Comp. Prep. Ex. 2-3 | Comp. Prep. Ex. 2-4 | Comp. Prep. Ex. 2-5 | Comp. Prep. Ex. 2-6 | Comp. Prep. Ex. 2-7 | Comp. Prep. Ex. 2-8 |
| Catalytic activity (kg PP/g cat · hr) | 15.0 | 14.8 | 14.2 | 15.3 | 14.5 | 3.1 | 7.2 | 13.6 | 8.1 | 10.2 | 1.5 | 6.5 | 5.8 |
| Tm (° C.) | 145 | 144 | 143 | 145 | 144 | 145 | 148 | 152 | 146 | 148 | 138 | 143 | 143 |
| MI (g/10 min) | 6.5 | 6.2 | 6.7 | 6.4 | 6.5 | 349.4 | 70.1 | 6.8 | 25.6 | 9.1 | 580 | 58 | 8.2 |
| Mw (g/mol) | 354,000 | 375,000 | 342,000 | 352,000 | 348,000 | 116,000 | 154,000 | 310,000 | 202,000 | 261,000 | 98,000 | 168,000 | 298,000 |
| MWD | 2.60 | 2.69 | 2.64 | 2.58 | 2.54 | 3.65 | 2.58 | 2.70 | 4.81 | 5.04 | 3.8 | 2.81 | 2.70 |

Referring to the results, the supported catalysts of Preparation Examples 2-1 to 2-5 including the transition metal compound according to the present disclosure had high catalytic activity of 14 kg PP/g cat·h or higher. From this, excellent productivity and improved morphology may be expected in the preparation of a polymer using the transition metal compound.

In addition, the homo polypropylenes of Examples 1 to 5 prepared using one of the supported catalysts of Preparation Examples 2-1 to 2-5 had a low Tm of 145° C. or less. Accordingly, processability of the homo polypropylene may be improved, and energy may be saved due to the lowered pared using the transition metal compound in which the same substituent group is bonded at position 3.

Further, the polymer of Comparative Example 3 prepared using the transition metal compound in which the position 2 in the first ligand was further substituted in addition to the position 4 had a greatly decreased MI, an increased Mw, a greatly increased Tm, and an increased MWD, as compared with Comparative Example 2.

The polymers of Comparative Examples 4 and 5 prepared using the transition metal compound in which the position 2 was further substituted or the positions 2 and 4 were further substituted in the first ligand structure in addition to the position 3 had an increased MI, a decreased Mw, and a greatly increased MWD, as compared with the examples. Particularly, the MWD was further increased when the position 4 was further substituted.

The polymer of Comparative Example 6 prepared using the transition metal compound in which both of the first and second ligand structures were substituted with an n-propyl group at position 3 had a decreased Tm due to low tacticity, a greatly decreased Mw, and a greatly increased MWD and MI. From this, it can be expected that the polymer of Comparative Example 6 has a reduced impact strength characteristic.

In addition, the polymer of Comparative Example 7 prepared using the transition metal compound in which only the position 2 was substituted in the second ligand structure had a significantly decreased Mw as compared with Example 2, and termination is expected to be accelerated. It was also confirmed that the polymer of Comparative Example 8 prepared using the transition metal compound in which only the position 4 was substituted with phenyl had decreased activity and Mw as compared with Example 2. This difference is due to the fact that the t-butylphenyl group present at the position 4 in the second ligand structure of the transition metal compound in Example 2 provided a sufficient inductive effect, thereby greatly increasing the catalytic activity.

From the above results, it was confirmed that the MI, Mw, and MWD of the polymer vary depending on the position and type of the substituent in the first and second ligands. When the transition metal compound including the first and second ligands of the indene structure has an asymmetric structure by substituting the position 3 in the first ligand and substituting the positions 2 and 4 in the second ligand with specific substituents, respectively, low Tm and MI, high Mw, and narrow MWD of the polymer, the advantageous effect of the present disclosure can be realized at the same time.

The invention claimed is:

1. A transition metal compound represented by the following Chemical Formula 1:

[Chemical Formula 1]

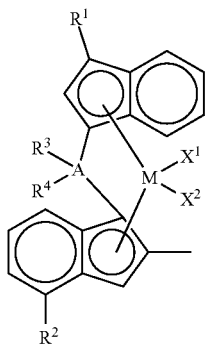

wherein, in Chemical Formula 1,
A is carbon or silicon,
M is a Group 4 transition metal,
$R^1$ is a $C_{1-20}$ alkyl; or a $C_{6-20}$ aryl unsubstituted or substituted with a $C_{1-20}$ alkyl,
$R^2$ is a $C_{6-20}$ aryl substituted with a $C_{1-20}$ alkyl,
$R^3$ and $R^4$ are each independently a $C_{1-20}$ alkyl, and
$X^1$ and $X^2$ are each independently a halogen.

2. The transition metal compound of claim 1, wherein the A is silicon and the M is zirconium.

3. The transition metal compound of claim 1, wherein the $R^1$ is a $C_{3-10}$ linear alkyl; a $C_{3-10}$ branched alkyl; phenyl; or phenyl substituted with a $C_{3-10}$ branched alkyl.

4. The transition metal compound of claim 1, wherein the $R^2$ is phenyl substituted with a $C_{3-6}$ branched alkyl.

5. The transition metal compound of claim 1, wherein the $R^3$ and $R^4$ are methyl.

6. The transition metal compound of claim 1, wherein the transition metal compound is selected from the group consisting of compounds having the following structures:

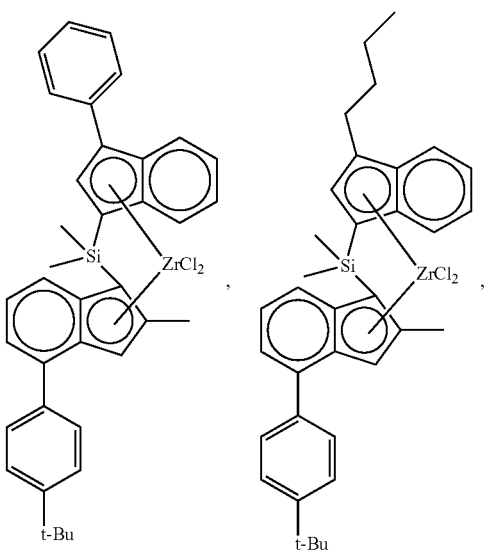

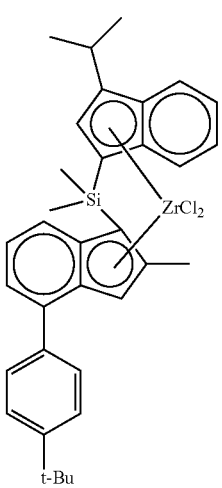

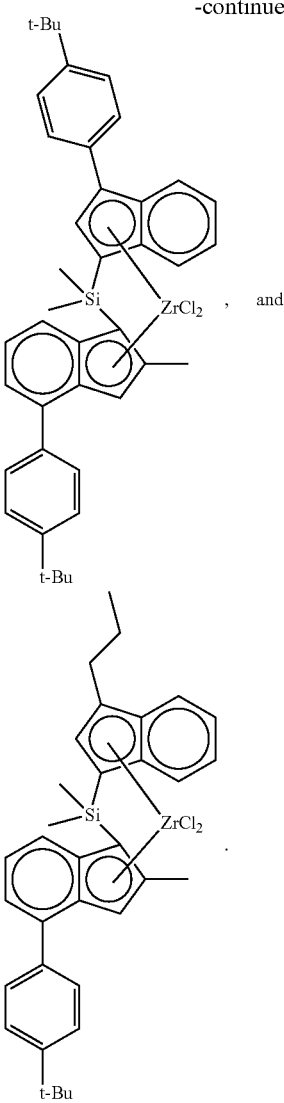

7. A catalyst composition comprising the transition metal compound of claim 1.

8. The catalyst composition of claim 7, further comprising a support.

9. The catalyst composition of claim 7, further comprising at least one cocatalyst selected from the group consisting of compounds represented by the following Chemical Formulae 3 to 5:

—[Al($R_{11}$)—O]$_m$—      [Chemical Formula 3]

wherein, in Chemical Formula 3, $R_{11}$ are the same as or different from each other, and are each independently a halogen, a $C_{1-20}$ hydrocarbon, or a $C_{1-20}$ halogen-substituted hydrocarbon; and m is an integer of 2 or more;

J($R_{12}$)$_3$      [Chemical Formula 4]

wherein, in Chemical Formula 4, $R_{12}$ are the same as or different from each other, and are each independently a halogen, a $C_{1-20}$ hydrocarbon, or a $C_{1-20}$ halogen-substituted hydrocarbon; and J is aluminum or boron;

[E-H]$^+$[ZQ$_4$]$^-$ or [E]$^+$[ZQ$_4$]$^-$      [Chemical Formula 5]

wherein, in Chemical Formula 5, E is a neutral or cationic Lewis base;

H is a hydrogen atom;

Z is a Group 13 element; and

Q are the same as or different from each other, and are each independently a $C_{6-20}$ aryl or a $C_{1-20}$ alkyl group, of which one or more hydrogen atoms are unsubstituted or substituted with a halogen, a $C_{1-20}$ hydrocarbon, alkoxy, or phenoxy.

10. The catalyst composition of claim 9, wherein the cocatalyst is selected from the group consisting of methylaluminoxane, ethylaluminoxane, isobutylaluminoxane, butylaluminoxane, and a mixture thereof.

11. The catalyst composition of claim 7, further comprising an antistatic agent.

12. The catalyst composition of claim 11, wherein the antistatic agent is an ethoxylated alkylamine represented by the following Chemical Formula 6:

$R^7$N—(CH$_2$CH$_2$OH)$_2$      [Chemical Formula 6]

wherein, in Chemical Formula 6, $R^7$ is a $C_{8-30}$ alkyl.

13. A method for preparing a homo polypropylene, comprising a step of polymerizing propylene monomers by introducing hydrogen in the presence of the catalyst composition of claim 7.

14. The method for preparing a homo polypropylene of claim 13, wherein the hydrogen is introduced in an amount of 50 to 700 ppm based on a total weight of the propylene monomers.

15. The method for preparing a homo polypropylene of claim 13, wherein the homo polypropylene satisfies the following conditions:

i) a melting temperature of 145° C. or less, ii) a melt index of 7 g/10 min or less when measured at 230° C. under a load of 2.16 kg according to ASTM D1238, iii) a weight average molecular weight of 340,000 g/mol or more, and iv) a molecular weight distribution of 2.7 or less.

16. The transition metal compound of claim 4, wherein the $C_{3-6}$ branched alkyl is substituted on the para-position of the phenyl.

17. The transition metal compound of claim 1, wherein $X^1$ and $X^2$ are chloride.

* * * * *